(12) United States Patent
Wang et al.

(10) Patent No.: US 11,451,289 B2
(45) Date of Patent: Sep. 20, 2022

(54) WIRELESS COMMUNICATION METHOD AND CORRESPONDING COMMUNICATION DEVICE

(71) Applicant: NTT DOCOMO, INC., Tokyo (JP)

(72) Inventors: Jing Wang, Beijing (CN); Hanning Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 103 days.

(21) Appl. No.: 16/958,500

(22) PCT Filed: Oct. 26, 2018

(86) PCT No.: PCT/CN2018/112140
§ 371 (c)(1),
(2) Date: Jun. 26, 2020

(87) PCT Pub. No.: WO2019/128433
PCT Pub. Date: Jul. 4, 2019

(65) Prior Publication Data
US 2020/0350982 A1    Nov. 5, 2020

(30) Foreign Application Priority Data
Dec. 28, 2017 (CN) .......................... 201711457416.6

(51) Int. Cl.
*H04B 7/185* (2006.01)
*H04W 36/00* (2009.01)

(52) U.S. Cl.
CPC .... *H04B 7/18506* (2013.01); *H04W 36/0058* (2018.08); *H04W 36/0072* (2013.01)

(58) Field of Classification Search
None
See application file for complete search history.

(56) References Cited

U.S. PATENT DOCUMENTS

| 10,304,343 B2 * | 5/2019 | Mustafic ............... G08G 5/0034 |
| 10,754,334 B2 * | 8/2020 | Celia ................... G05B 23/0221 |
| 11,076,328 B2 * | 7/2021 | Lu .......................... H04W 24/10 |

(Continued)

OTHER PUBLICATIONS

International Search Report issued in PCT/CN2018/112140 dated Jan. 17, 2019 (2 pages).

(Continued)

*Primary Examiner* — Tri H Phan
(74) *Attorney, Agent, or Firm* — Osha Bergman Watanabe & Burton LLP

(57) ABSTRACT

Provided are a wireless communication method and corresponding communication devices. The wireless communication method includes: transmitting, by a first communication device, first information to a second communication device, where the first information includes identification information of an aerial user terminal. The first communication device includes a transmitting unit, which is configured to transmit first information to a second communication device, where the first information includes identification information of an aerial user terminal. The second communication device includes a receiving unit, which is configured to receive first information from a first communication device, where the first information includes identification information of an aerial user terminal.

15 Claims, 5 Drawing Sheets

(56) References Cited

U.S. PATENT DOCUMENTS

| | | | |
|---|---|---|---|
| 11,115,901 B2* | 9/2021 | Shi | H04W 72/048 |
| 11,122,486 B2* | 9/2021 | Kalhan | H04W 72/082 |
| 2018/0324662 A1* | 11/2018 | Phuyal | H04B 7/18504 |
| 2020/0221280 A1* | 7/2020 | Hong | H04W 12/71 |
| 2020/0252941 A1* | 8/2020 | Schmidt | H04W 36/16 |
| 2021/0144607 A1* | 5/2021 | Hong | H04W 36/08 |
| 2021/0185568 A1* | 6/2021 | Chang | H04W 74/004 |
| 2022/0012496 A1* | 1/2022 | Hagio | H04Q 9/00 |

OTHER PUBLICATIONS

Written Opinion of the International Searching Authority issued in PCT/CN2018/112140 dated Jan. 17, 2019 (4 pages).
3GPP TR 36.777 V1.0.0 "3rd Generation Partnership Project; Technical Specification Group Radio Access Network; Study on Enhanced LTE Support for Aerial Vehicles (Release 15)" Dec. 2017 (150 pages).

* cited by examiner

WIRELESS COMMUNICATION METHOD AND CORRESPONDING COMMUNICATION DEVICE

TECHNICAL FIELD

The present disclosure relates to a field of mobile communication, and more particularly to a wireless communication method and corresponding communication devices that may be used in a wireless communication system including aerial user terminals (such as drones).

BACKGROUND

In recent years, drones (or aerials or UAVs (Unmanned Aerial Vehicles)) have been widely used, and wireless communication networks, such as Long-Term Evolution (LTE) networks, may be used to support drone services due to good performance thereof, for example, to communicate with drones during drone flight, or to support terrestrial controllers/personnel to communicate with drones over wireless networks. Herein, a user terminal, such as a drone, capable of flying in the air and communicating with a base station through a wireless communication network may be referred to as an aerial user terminal.

Compared with a terrestrial user terminal, an aerial user terminal tends to move faster, and thus it may switch among cells more frequently. In addition, since the aerial user terminal flies in the air, the aerial user terminal encounters fewer obstacles than a terrestrial user terminal, and thus the aerial user terminal may have communication conditions for line-of-sight transmission. These characteristics of the aerial user terminal enable cells in a farther and wider range to detect the aerial user terminal. Therefore, these cells will suffer interference from the aerial user terminal, and the aerial user terminal will also suffer interference from these cells. However, methods for interference management in the prior art are mainly for terrestrial user terminals, and cannot be effectively applied to aerial user terminals. Therefore, a method for interference management suitable for aerial user terminals is needed.

SUMMARY OF THE DISCLOSURE

According to an aspect of the present disclosure, a wireless communication method is provided. The method comprises: transmitting, by a first communication device, first information to a second communication device, wherein the first information includes identification information of an aerial user terminal.

According to another aspect of the present disclosure, a first communication device for wireless communication is provided. The first communication device comprises: a transmitting unit configured to transmit first information to a second communication device, wherein the first information includes identification information of an aerial user terminal.

In an embodiment, the first information further includes at least one piece of mobility status information of the aerial user terminal, location status information of the aerial user terminal, radio resource measurement information of the aerial user terminal, configuration information of the aerial user terminal, and scheduling information of the aerial user terminal.

In an embodiment, the transmitting unit is further configured to transmit second information to the second communication device, wherein the second information includes information on forwarding the first information.

In an embodiment, the information on forwarding the first information includes a number of times to forward the first information.

In an embodiment, the information on forwarding the first information includes set information of base stations to which the first information is forwarded.

In an embodiment, the first communication device further comprises a receiving unit configured to receive a first request for the first information transmitted by the second communication device; wherein the transmitting unit is configured to transmit the first information to the second communication device in response to the first request.

In an embodiment, the receiving unit is further configured to receive a second request transmitted by the second communication device, wherein the second request includes request information for at least one piece of the mobility status information of the aerial user terminal, the location status information of the aerial user terminal, the radio resource measurement information of the aerial user terminal, the configuration information of the aerial user terminal, and the scheduling information of the aerial user terminal; and wherein the transmitting unit is configured to transmit information requested by the second communication device to the second communication device in response to the second request.

According to another aspect of the present disclosure, a wireless communication method is provided. The method comprises: receiving, by a second communication device, first information from a first communication device, wherein the first information includes identification information of an aerial user terminal.

According to another aspect of the present disclosure, a second communication device for wireless communication is provided. The second communication device comprises: a receiving unit configured to receive first information from a first communication device, wherein the first information includes identification information of an aerial user terminal.

In an embodiment, the first information further includes at least one piece of mobility status information of the aerial user terminal, location status information of the aerial user terminal, radio resource measurement information of the aerial user terminal, configuration information of the aerial user terminal, and scheduling information of the aerial user terminal.

In an embodiment, the receiving unit is further configured to receive second information from the first communication device, wherein the second information includes information on forwarding the first information; and the second communication device further comprises a transmitting unit configured to determine whether a forwarding condition is satisfied or not according to the second information, and forward the first information if the forwarding condition is satisfied.

In an embodiment, the information on forwarding the first information includes a number of times to forward the first information.

In an embodiment, the information on forwarding the first information includes set information of base stations to which the first information is forwarded.

In an embodiment, the transmitting unit is further configured to transmit a first request for the first information to the first communication device before the receiving unit receives the first information from the first communication device.

In an embodiment, the transmitting unit is further configured to transmit a second request to the first communication device before the receiving unit receives the second information from the first communication device, wherein the second request includes request information for at least one piece of the mobility status information of the aerial user terminal, the location status information of the aerial user terminal, the radio resource measurement information of the aerial user terminal, the configuration information of the aerial user terminal, and the scheduling information of the aerial user terminal.

BRIEF DESCRIPTION OF THE DRAWINGS

The above and other objects, features and advantages of the present disclosure will become clearer by describing embodiments of the present disclosure in details in conjunction with accompanying drawings. The accompanying drawings are used to provide a further understanding of the embodiments of the present disclosure, constitute a part of this specification, and explain the present disclosure together with the embodiments of the present disclosure, but do not constitute a limitation on the present disclosure. In the accompanying drawings, like reference numerals usually represent like means or steps.

DESCRIPTION OF THE EMBODIMENTS

In order to make objectives, technical solutions and advantages of the present disclosure clearer, exemplary embodiments according to the present disclosure will be described in details below with reference to the accompanying drawings.

First, a wireless communication system in which the embodiments of the present disclosure may be applied will be described with reference to FIG. 1. The wireless communication system may be an LTE system or any other type of wireless communication system, such as an LTE-A system, a 5G system and the like. Hereinafter, the embodiments of the present disclosure will be described by using the LTE system as an example. However, it should be appreciated that the following description may also be applied to other types of wireless communication systems.

Figure 1:
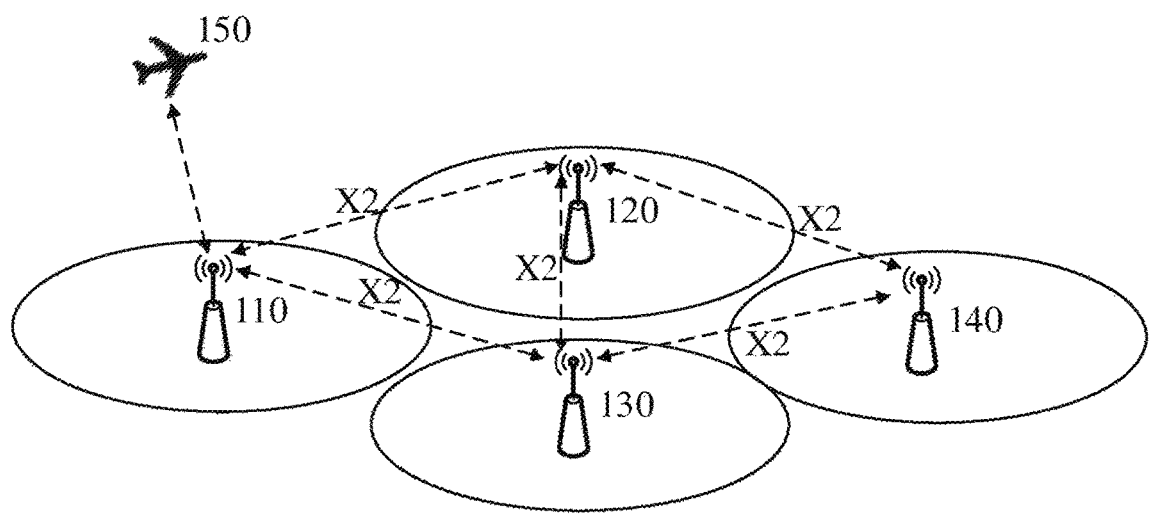
FIG. 1 is a schematic diagram of a wireless communication system in which the embodiments of the present disclosure may be applied.

As shown in FIG. 1, the wireless communication system 100 may comprise a first base station (BS) 110 and an aerial user terminal (UT) 150, where the first base station 110 is a serving base station for the aerial user terminal 150. The wireless communication system 100 may further comprise a plurality of base stations adjacent to the first base station 110, such as a second base station 120 and a third base station 130, and these base stations adjacent to the first base station 110 may communicate with the first base station 110 through an X2 interface. Furthermore, the wireless communication system 100 may further comprise a plurality of base stations that are not adjacent to the first base station 110, such as a fourth base station 140. It should be noted that although the fourth base station 140 is not a base station adjacent to the first base station 110, the fourth base station 140 may be a base station adjacent to the second base station 120 and the third base station 130, and therefore the fourth base station 140 may communicate with the second base station 120 and the third base station 130 through an X2 interface. The aerial user terminal 150 may be an aerial vehicle (AV) capable of flying in the air and communicating with the first base station 110, such as a drone (or a UAV, such as a drone based on the Rel. 15 of 3GPP specification, or an enhanced drone based on the Rel. 15 of 3GPP specification). Herein, the aerial user terminal may also be interchangeably referred to as an aerial user equipment, a user terminal in the air, a user equipment in the air and the like. It should be appreciated that although four base stations and one aerial user terminal are shown in FIG. 1, this is merely schematic, and the wireless communication system may further comprise more or less base stations and/or more aerial user terminals. In addition, the wireless communication system may also comprise one or more user equipment or terminals (not shown) that are not aerial user terminals, such as, terrestrial user equipment or terminals.

Figure 2A:
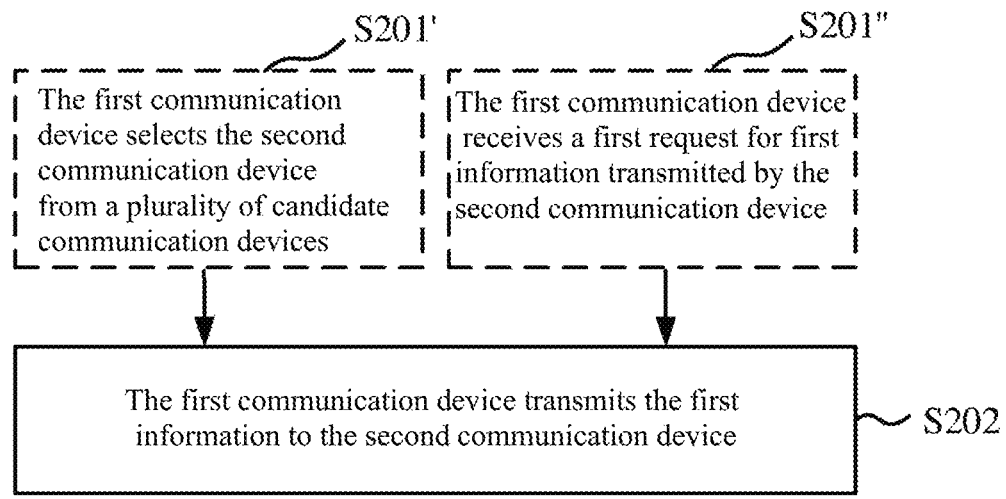
FIG. 2A is a flowchart of a wireless communication method according to one embodiment of the present disclosure.
Figure 2B:
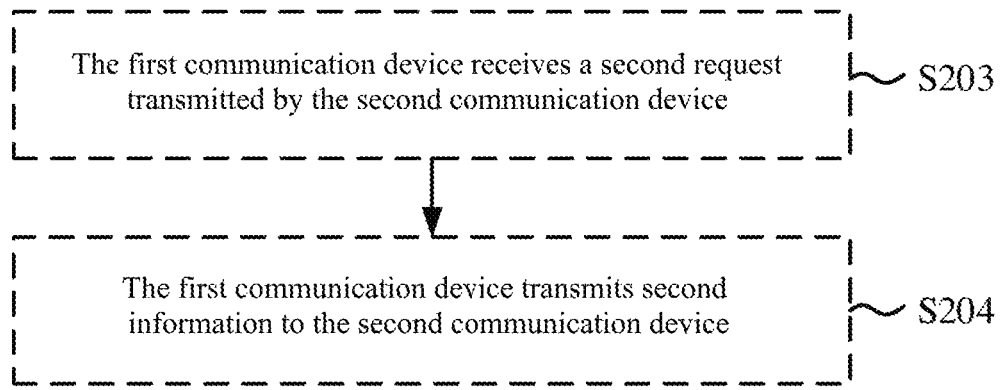
FIG. 2B is another flowchart of the wireless communication method according to one embodiment of the present disclosure.

A wireless communication method 200 according to one embodiment of the present disclosure will be described below with reference to FIG. 2A and FIG. 2B. FIG. 2A is a flowchart of a wireless communication method 200 according to one embodiment of the present disclosure. FIG. 2B is another flowchart of the wireless communication method 200 according to one embodiment of the present disclosure. As shown in FIG. 2A, in step S202, a first communication device transmits first information to a second communication device, where the first information includes identification information of an aerial user terminal. The first information in this step may be information indicating that it is an aerial user terminal, rather than information indicating that it is an ordinary user equipment or terminal. Herein, the first communication device and the second communication device may be, for example, the first base station 110 and the second base station 120 shown in FIG. 1, respectively, and the aerial user terminal may be the aerial user terminal 150 shown in FIG. 1.

In this embodiment, the identification information of the aerial user terminal may include information that can uniquely identify the aerial user terminal, for example, International Mobile Subscriber Identification (ISMI) of the aerial user terminal, a Radio Network Temporary Identity (RNTI) of the aerial user terminal such as a Cell-RNTI (C-RNTI), a Temporary Mobile Subscriber Identity (TMSI) of the aerial user terminal that is a unique UE identity and from a core network, combination information of traditional IMSI and a user type (such as terrestrial user or aerial user type identification), combination information of a traditional C-RNTI and a user type, combination information of a traditional TMSI and a user type and the like. As a serving base station for the aerial user terminal, the first communication device may acquire the identification information of the aerial user terminal. The specific acquisition manner may adopt a conventional manner. For example, the serving base station for the aerial user terminal may obtain the identification information of the aerial user terminal through a core network, or the serving base station may obtain the identification information of the aerial user terminal after the aerial user terminal initially accesses the serving base station, or the serving base station for the aerial user terminal may obtain the identification information of the aerial user terminal by a report of the aerial user terminal.

In this embodiment, the first communication device and the second communication device may pre-negotiate or pre-determine a data format for transmitting the first information, so that when the first communication device transmits the first information in the data format and the second communication device receives the first information transmitted in the data format, the second communication device may acquire that the first information is information related to the aerial user terminal rather than information related to an ordinary user equipment or terminal.

With this embodiment, the first communication device may transmit the identification information of the aerial user terminal to the second communication device, so as to perform interference management such as detection, suppression and avoidance for interference suffered by the second communication device from the aerial user terminal (i.e., uplink interference) and/or interference suffered by the aerial user from the second communication device (i.e., downlink interference). For example, taking the uplink interference as an example, after the second communication device acquires the identification information of the aerial user terminal, the second communication device may detect the presence of the aerial user terminal and take certain actions to suppress interference from the aerial user terminal. Specifically, for example, the second communication device may track the aerial user terminal and predict an interference level of the aerial user terminal to avoid interference, and the second communication device may also initiate cooperation with the first communication device to suppress interference if necessary.

It should be appreciated that when the first communication device serves as a serving base station for a plurality of aerial user terminals, the first information transmitted by the first communication device to the second communication device may include identification information of part or all of the plurality of aerial user terminals served by the first communication device. For example, the first communication device may acquire identification information of the plurality of aerial user terminals that it serves, and transmit the identification information of part or all of the plurality of aerial user terminals to the second communication device by including them in the first information in the form of a list.

According to one example of this embodiment, the first information in step S202 may further include at least one piece of mobility status information of the aerial user terminal, location status information of the aerial user terminal, radio resource measurement information of the aerial user terminal, configuration information of the aerial user terminal, and scheduling information of the aerial user terminal. The mobility status information of the aerial user terminal may include, for example, a flying speed and a flying direction of the aerial user terminal, a flying mode of the aerial user terminal (for example, a GPS mode (such as a mode of using a GPS module to achieve precise hovering), and a mobility mode (such as a mode of achieving precise hovering by a vision system), an attitude mode (such as a mode of positioning without using a GPS module and vision system) or a manual mode (such as a mode of controlling by a remote control), etc.) and the like. The location status information of the aerial user terminal may include, for example, a flying height of the aerial user terminal, a longitude and a latitude of the aerial user terminal and the like. The radio resource measurement information of the aerial user terminal may include, for example, a report formed by the aerial user terminal measuring radio resources, such as a Reference Signal Receiving Power (RSRP) measurement report and the like. The configuration information of the aerial user terminal may include configuration information of signaling, for example, configuration information of Sounding Reference Signals (SRSs). The scheduling information of the aerial user terminal may include, for example, uplink scheduling information of the aerial user terminal, downlink scheduling information of the aerial user terminal, a combination thereof and the like. The scheduling information is information on time-frequency resources occupied by the aerial user terminal for example.

In this example, the first communication device transmits the identification information of the aerial user terminal and at least one of the mobility status information, the location status information, the radio resource measurement information, the configuration information, or the scheduling information to the second communication device, so as to perform more accurate interference management such as detection, suppression and avoidance for interference suffered by the second communication device from the aerial user terminal (i.e., uplink interference) and/or interference suffered by the aerial user from the second communication device (i.e., downlink interference).

For example, taking the uplink interference as an example, after the second communication device acquires the identification information of the aerial user terminal, as well as the mobility status information and/or the location status information, the second communication device may predict a current interference level or a later interference level imposed by the aerial user terminal. Specifically, for example, the second communication device may predict whether the aerial user terminal is moving away or approaching the second communication device according to the flying speed, the flying height, the flying mode and the like of the aerial user terminal, thereby predicting interference from the aerial user terminal to acquire a later interference level imposed by the aerial user terminal.

For another example, taking the uplink interference as an example, after the second communication device acquires the identification information and radio resource measurement information of the aerial user terminal, the second communication device may directly infer an interference level imposed by the aerial user terminal. Specifically, for example, the second communication device may acquire RSRP according to an RSRP report of the aerial user terminal, then may infer a downlink path loss of the aerial user terminal according to the RSRP and a downlink transmission power of the second communication device, then may infer an uplink path loss of the aerial user terminal, and finally determine the interference level imposed by the aerial user terminal according to the uplink path loss of the aerial user terminal.

For another example, taking the uplink interference as an example, after the second communication device acquires the identification information of the aerial user terminal, as well as the configuration information and/or the scheduling information, the second communication device may directly measure the interference level imposed by the aerial user terminal. Specifically, for example, the second communication device may directly measure the interference level imposed by the aerial user terminal according to SRS configuration or UL scheduling information of the aerial user terminal.

It may be understood that when the first information includes a plurality of pieces of information among the mobility status information, the location status information, the radio resource measurement information, the configuration information, and the scheduling information of the aerial user terminal, the above-described operations of interference management such as detection, suppression and avoidance for the uplink interference and the downlink interference according to one or more pieces of information may be combined.

According to the above description, when the first communication device serves as a serving base station for a plurality of user terminals, the first information transmitted by the first communication device to the second communication device may not merely include identification information of part or all of the plurality of aerial user terminals served by the first communication device, and may also include one or more pieces of the mobility status information, the location status information, the radio resource measurement information, the configuration information, and the scheduling information of the part or all of the aerial user terminals. In addition, according to one example of this embodiment, for each aerial user terminal of the part or all of the aerial user terminals, information included in the first information may be different. For example, the first information may include identification information and mobility status information of a certain aerial user terminal, and may also include identification information and configuration information of another aerial user terminal.

The first information will be described again below with a specific example. Table 1 below shows an exemplary format of the first information. As shown in Table 1, in the first information, the identification information of the aerial user terminal may be mandatory (abbreviated as "M"), and the mobility status information, the location status information, the radio resource measurement information, the configuration information or the scheduling information of the aerial user terminal may be optional (abbreviated as "O").

TABLE 1 an exemplary format of the first information

| Type of Information | | First Information |
|---|---|---|
| Identification Information | | M |
| Mobility Status Information | Flying mode | O |
| | Flying speed | O |
| Location Status Information | Location/Height | O |
| Radio Resource Measurement Information | | O |
| Configuration Information | | O |
| Scheduling Information | | O |

Furthermore, according to one example of this embodiment, the first communication device may actively select the second communication device before transmitting the first information. For example, before step S202, the method 200 may further comprise step S201', as shown in FIG. 2A. In step S201', the first communication device selects the second communication device from a plurality of candidate communication devices. For example, the plurality of candidate communication devices may be a plurality of communication devices adjacent to the first communication device. As mentioned above, the first communication device may be the first base station 110 shown in FIG. 1. Referring back to FIG. 1, base stations adjacent to the first base station 110, that is, the second base station 120 and the third base station 130 may be the plurality of candidate communication devices herein.

In this case, the first communication device may arbitrarily select one of the plurality of candidate communication devices, such as the second base station 120, as the second communication device. Alternatively, the first communication device may also select a communication device (such as the second base station 120) that suffers severe interference from the aerial user terminal from the plurality of candidate communication devices as the second communication device according to the radio resource measurement information of the aerial user terminal, such as an RSRP report. Alternatively, the first communication device may also select a communication device (such as the second base station 120) that may suffer severe interference from the aerial user terminal from the plurality of candidate communication devices as the second communication device according to the mobility status information of the aerial user terminal, such as a flying speed, a flying direction, and the like.

According to another example of this embodiment, the first communication device may also passively select the second communication device, and then transmit the first information to the second communication device. For example, the first communication device may take a communication device that transmits a request to it as the second communication device. For example, before step S202, the method 200 may further comprise step S201", as shown in FIG. 2A. In step S201", the first communication device receives a first request for the first information transmitted by the second communication device. Then, the first communication device performs step S202 in response to the first request received in step S201".

In this example, the first request in step S201" may be the second communication device requesting from the first communication device information of part or all of the aerial user terminals served by the first communication device, such as one or more pieces of the identification information, the mobility status information, the location status information, the radio resource measurement information, the configuration information, and the scheduling information. For example, the second communication device may merely request from the first communication device identification information of all aerial user terminals served by the first communication device, and then in response to the request from the second communication device, the first communication device may transmit the identification information of all aerial user terminals that it serves to the second communication device by including them in the first information.

For another example, the second communication device may request from the first communication device identification information and mobility status information of a part of aerial user terminals (such as aerial user terminals with a relatively high flying height) served by the first communication device. Then, in response to the request from the second communication device, the first communication device may transmit the identification information and the mobility status information of the part of aerial user terminals to the second communication device by including them in the first information.

In this example, the first request in step S201" may also be other devices requesting, via the second communication device, from the first communication device information of part or all of the aerial user terminals served by the first communication device, such as one or more pieces of the identification information, the mobility status information, the location status information, the radio resource measurement information, the configuration information, and the scheduling information. For example, other devices may transmit request information for the first communication device to the second communication device. After receiving the request information, the second communication device may process the request information and transmit the processed request information to the first communication device. Certainly, the second communication device may not process the request information, and directly transmit the request information to the first communication device.

Furthermore, when the first request received by the first communication device merely requests the identification information of the aerial user terminal, the first communication device may further receive another request transmitted by the second communication device after transmitting the identification information of the aerial user terminal. The another request may request for other information of the aerial user terminal in addition to the identification information of the aerial user terminal, such as one or more pieces of the mobility status information, the location status information, the radio resource measurement information, the configuration information, and the scheduling information of the aerial user terminal. Alternatively, the another request may also request for the identification information of the aerial user terminal and other information of the aerial user terminal, such as one or more pieces of the mobility status information, the location status information, the radio resource measurement information, the configuration information, and the scheduling information of the aerial user terminal.

For example, according to one example of this embodiment, after step S202, the method 200 may further comprise step S203, as shown in FIG. 2B. In step S203, the first communication device receives a second request transmitted by the second communication device, where the second request includes request information for at least one piece of the mobility status information of the aerial user terminal, the location status information of the aerial user terminal, the radio resource measurement information of the aerial user terminal, the configuration information of the aerial user terminal, and the scheduling information of the aerial user terminal. Then, the first communication device transmits the requested information to the second communication device in response to the second request received in step S203.

In this example, the second request may be a request for other information in addition to identification information of part of the plurality of aerial user terminals, such as a request for one or more pieces of mobility status information, location status information, radio resources measurement information, configuration information, and scheduling information of the part of aerial user terminals.

Furthermore, in order to enable farther communication devices that are not adjacent to (or do not have a communication interface, such as an X2 interface) also acquire the first information, when transmitting the first information to the second communication device, the first communication device may instruct the second communication device to forward the received first information to other communication devices. For example, according to one example of this embodiment, at or after step S202, the method 200 may further comprise step S204, as shown in FIG. 2B. In step S204, the first communication device transmits second information to the second communication device, where the second information includes information on forwarding the first information.

In this example, the information on forwarding the first information may include the number of times to forward the first information. For example, the number of times to forward the first information may be a hopping number to transmit the first information by hopping. That is, the first information may be forwarded to a plurality of base stations in a multi-hop manner. As mentioned above, the first communication device and the second communication device may be the first base station 110 and the second base station 120 shown in FIG. 1, respectively. Referring back to FIG. 1, the first base station 110 may transmit the hopping number to transmit the first information by hopping to the second base station 120. After receiving the hopping number, the second base station 120 may determine whether a forwarding condition is satisfied or not according to the hopping number, and if yes, forward the first information. In addition, after receiving the hopping number, the second base station 120 may determine that the forwarding condition is not satisfied according to the hopping number, and then the second base station 120 may not forward the first information, or may transfer the first information to other base stations in other ways. For example, after the second base station 120 receives the hopping number, the second base station 120 may perform a mathematical operation (i.e., an operation of subtracting one) on the received hopping number to obtain an updated hopping number, then determine whether the updated hopping number is non-zero or not, and if yes, it may determine that the second base station 120 satisfies the forwarding condition, otherwise, it may determine that the second base station 120 does not satisfy the forwarding condition. In addition, when the second base station 120 satisfies the forwarding condition, the second base station 120 may also forward the updated hopping number and the first information to a next base station. It should be noted that the second base station 120 would not forward the first information back to the first base station 110.

Herein, the hopping number received by the second base station 120 being 3 will be taken as an example for description. For example, the second base station 120 receives a hopping number of 3 from the first base station 110 through an X2 interface. Since the first information has been forwarded once by the first base station 110 to the second base station 120, the second base station 120 may perform an operation of subtracting one on the hopping number and obtain an updated hopping number of 2. Since the updated hopping number of 2 is non-zero, the second base station 120 satisfies the forwarding condition, and then the second base station 120 may forward the first information and the updated hopping number of 2 to the fourth base station 140 through the X2 interface. The fourth base station 140 may perform similar operations as the second base station 120. Until the forwarding condition is not satisfied, forwarding of the first information may be stopped. It should be noted that the second base station 120 would not forward the first information back to the first base station 110. It can be seen that, in a multi-hop manner, the first communication device forwards the first information to its adjacent base station and farther base stations, so that the farther base stations may also acquire information related to the aerial user terminal served by the first communication device for interference management.

In this example, the information on forwarding the first information may further include set information of base stations to which the first information may be forwarded. That is, the first information may be forwarded to one or more base stations of a set of base stations. As mentioned above, the first communication device and the second communication device may be the first base station 110 and the second base station 120 shown in FIG. 1, respectively. Referring back to FIG. 1, the first base station 110 may determine that the set information of the base stations to which the first information is forwarded may be, for example, (the second base station 120, the third base station 130, the fourth base station 140), then the first base station 110 may transmit the set information of the base stations to base stations in the set of base stations that are adjacent to the first base station 110, such as the second base station 120 and the third base station 130. Since base stations in the set of base stations that are not adjacent to the first base station 110, such as the fourth base station 140, cannot directly communicate with the first base station 110, the first base station 110 cannot transmit the first information to the fourth base station 140. Hereinafter, the first base station 110 transmitting the first information to the second base station 120 will be taken as an example for description. After receiving the set information of the base stations, the second base station 120 may determine whether the forwarding condition is satisfied or not according to the set information of the base stations, and if yes, forward the first information. For example, the second base station 120 may determine whether there is its own neighboring base stations or not in the set information of the base stations, such as whether there is the fourth base station 140 adjacent to the second base station 120 or not, and if yes, it may forward the first information to the fourth base station 140 in the set of base stations. In addition, after the second base station 120 receives the set information of the base stations, it may determine that the forwarding condition is not satisfied according to the set information of the base stations, then the second base station 120 may not forward the first information, or may transfer the first information to other base stations in other ways. It should be noted that the second base station 120 would not forward the first information back to the first base station 110.

Furthermore, the first base station 110 may also update the set information of the base stations, and transmit the updated set information of the base stations to a next base station or a plurality of base stations. For example, since the first information has been forwarded by the first base station 110 to the second base station 120 adjacent to the first base station 110, the first base station 110 may remove the second base station 120 from the set information of the base stations to obtain updated set information of the base stations, such as {the third base station 130, the fourth base station 140}, and then forward the first information and the updated set information of the base stations, (the third base station 130, the fourth base station 140), to the second base station 120. The second base station 120 may perform operations similar to the first base station 110. Until the updated set information of the base stations is empty, forwarding of the first information may be stopped.

For another example, in the case that the first information has been forwarded by the first base station 110 to the second base station 120 adjacent to the first base station 110 and has also been forwarded by the first base station 110 to the third base station 130 adjacent to the first base station 110, the first base station 110 may remove the second base station 120 and the third base station 130 from the set information of the base stations to obtain updated set information of the base stations, such as {the fourth base station 140}, and then forward the first information and the updated set information of the base stations, (the base station 140), to the second base station 120 and the third base station 130. Both the second base station 120 and the third base station 130 may perform operations similar to the first base station 110, that is, to remove the fourth base station 140 adjacent thereto from the set information of the base stations, and then forward the first information and the empty set information of the base stations to the fourth base station 140, or just forward the first information to the fourth base station 140. After receiving the first information, the fourth base station 140 no longer forwards the first information. It can be seen that, in this way, the first communication device may also forward the first information to its neighboring base stations and farther base stations, so that the farther base stations may also acquire information related to the aerial user terminal served by the first communication device for interference management.

The method 200 shown in FIGS. 2A and 2B has been described above in conjunction with the wireless communication system 100 shown in FIG. 1. In the above description, it is also mentioned that the first communication device and the second communication device in the method 200 may be the first base station 110 and the second base station 120 in the wireless communication system 100 shown in FIG. 1. In this case, the first information, the second information, the first request, or the second request may be transmitted between the first communication device and the second communication device through the X2 interface.

However, the present disclosure is not limited thereto. According to another example of this embodiment, the first communication device in the method 200 may be the first base station 110 in the wireless communication system 100 shown in FIG. 1, and the second communication device may be a core network equipment (not shown) in the wireless communication system 100, such as a Mobility Management Entity (MME). In this case, the first information, the second information, the first request, or the second request may be transmitted between the first communication device and the MME through an S1 interface. Moreover, after receiving the first information and the second information transmitted by the first communication device, the MME may forward these information to other base stations, such as the second base station 120 in the wireless communication system 100 shown in FIG. 1. Furthermore, after receiving the first request and the second request transmitted by other base stations, such as the second base station 120 in the wireless communication system 100 shown in FIG. 1, the MME may also forward these requests to the first communication device.

Furthermore, according to one example of this embodiment, the first communication device may periodically transmit the first information and/or the second information to the second communication device. For example, after periodically receiving a radio resource measurement report of the aerial user terminal, such as an RSRP report, the first communication device may periodically perform step S202 and/or step S204 accordingly.

According to another example of this embodiment, the first communication device may non-periodically transmit the first information and/or the second information to the second communication device. For example, the first communication device may determine when to transmit the first information and/or the second information to the second communication device according to a network status of the wireless communication system. For example, when the network status of the wireless communication system is poor, the minimum number of cells that need to be measured may be set for the aerial user terminal, to trigger the aerial user terminal to report results of radio resource measurement to the first communication device, so that the aerial user terminal reports to the first communication device after cell measurement is finished. In this case, the first communication device may perform step S202 and/or step S204 after receiving the radio resource measurement report of the aerial user terminal.

With the above embodiment, the first communication device may transmit information related to the aerial user terminal to the second communication device, so as to perform interference management such as detection, suppression and avoidance for interference suffered by the second communication device from the aerial user terminal (i.e., uplink interference) and/or interference suffered by the aerial user from the second communication device (i.e., downlink interference).

Figure 3:
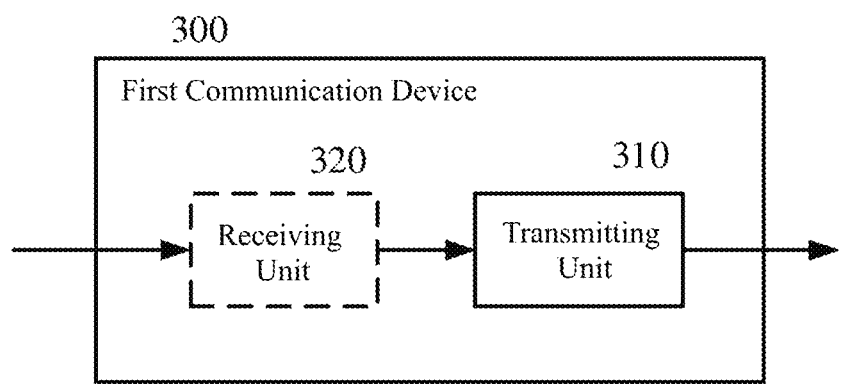
FIG. 3 shows a schematic structural diagram of a first communication device according to one embodiment of the present disclosure.

A first communication device 300 that performs the method 200 shown in FIGS. 2A and 2B according to one embodiment of the present disclosure will be described below with reference to FIG. 3. FIG. 3 shows a schematic structural diagram of the first communication device 300 according to one embodiment of the present disclosure. Since functions of the first communication device 300 are the same as the details of the method described above with reference to FIGS. 2A and 2B, a detailed description of the same content is omitted herein for simplicity.

As shown in FIG. 3, the first communication device 300 comprises a transmitting unit 310 configured to transmit first information to a second communication device, where the first information includes identification information of an aerial user terminal. It should be noted that although merely one unit of the first communication device 300 is shown in FIG. 3, this is merely schematic, and the first communication device 300 may further comprise a plurality of other units, which are omitted herein for being irrelevant with the inventive concept.

The first information transmitted by the transmitting unit 310 may be information indicating that it is an aerial user terminal, rather than information indicating that it is an ordinary user equipment or terminal. Herein, the first communication device 300 and the second communication device may be, for example, the first base station 110 and the second base station 120 shown in FIG. 1, respectively, and the aerial user terminal may be the aerial user terminal 150 shown in FIG. 1.

With this embodiment, the first communication device may transmit the identification information of the aerial user terminal to the second communication device, so as to perform interference management such as detection, suppression and avoidance for interference suffered by the second communication device from the aerial user terminal (i.e., uplink interference) and/or interference suffered by the aerial user from the second communication device (i.e., downlink interference).

It should be appreciated that when the first communication device 300 serves as a serving base station for a plurality of aerial user terminals, the first information transmitted by the transmitting unit 310 to the second communication device may include identification information of part or all of the plurality of aerial user terminals served by the first communication device. For example, the first communication device 300 may acquire identification information of the plurality of aerial user terminals that it serves, and transmit, through the transmitting unit 310, the identification information of part or all of the plurality of aerial user terminals to the second communication device by including them in the first information in the form of a list.

According to one example of this embodiment, the first information transmitted by the transmitting unit 310 may further include at least one of mobility status information of the aerial user terminal, location status information of the aerial user terminal, radio resource measurement information of the aerial user terminal, configuration information of the aerial user terminal, and scheduling information of the aerial user terminal. The specific description is as described above.

In this example, the transmitting unit 310 transmits, to the second communication device, the identification information of the aerial user terminal and at least one of the mobility status information, the location status information, the radio resource measurement information, the configuration information, or the scheduling information, so as to perform more accurate interference management such as detection, suppression and avoidance for interference suffered by the second communication device from the aerial user terminal (i.e., uplink interference) and/or interference suffered by the aerial user from the second communication device (i.e., downlink interference).

Furthermore, according to one example of this embodiment, the transmitting unit 310 may be further configured to actively select the second communication device before transmitting the first information. For example, the transmitting unit 310 may be further configured to select the second communication device from a plurality of candidate communication devices before transmitting the first information. For example, the plurality of candidate communication devices may be a plurality of communication devices adjacent to the first communication device 300. As mentioned above, the first communication device 300 may be the first base station 110 shown in FIG. 1. Referring back to FIG. 1, base stations adjacent to the first base station 110, that is, the second base station 120 and the third base station 130 may be the plurality of candidate communication devices herein.

According to another example of this embodiment, the transmitting unit 310 may also be configured to passively select the second communication device, and then transmit the first information to the second communication device. For example, the transmitting unit 310 may take a communication device that transmits a request to the first communication device 300 as the second communication device. For example, the first communication device may further comprise a receiving unit 320 configured to receive a first request for the first information transmitted by the second communication device, and the transmitting unit 310 may be configured to transmit the first information to the second communication device in response to the first request.

In this example, the first request received by the receiving unit 320 may be the second communication device requesting from the first communication device 300 information of part or all of the aerial user terminals served by the first communication device, such as one or more pieces of the identification information, the mobility status information, the location status information, the radio resource measurement information, the configuration information, and the scheduling information. For example, the second communication device may merely request from the first communication device 300 identification information of all aerial user terminals served by the first communication device, and then in response to the request from the second communication device, the transmitting unit 320 may transmit identification information of all aerial user terminals that it serves to the second communication device by including them in the first information.

For another example, the second communication device may request from the first communication device 300 identification information and mobility status information of a part of aerial user terminals (such as aerial user terminals with relatively high flying height) served by the first communication device. Then, in response to the request from the second communication device, the transmitting unit 310 may transmit the identification information and the mobility status information of the part of aerial user terminals to the second communication device by including them in the first information.

In this example, the first request received by the receiving unit 320 may also be other devices requesting, via the second communication device, from the first communication device 300 information of part or all of the aerial user terminals served by the first communication device, such as one or more pieces of the identification information, the mobility status information, the location status information, the radio resource measurement information, the configuration information, and the scheduling information. For example, other devices may transmit request information for the first communication device 300 to the second communication device. After receiving the request information, the second communication device may process the request information and transmit the processed request information to the receiving unit 320. Certainly, the second communication device may not process the request information, and directly transmit the request information to the receiving unit 320.

Furthermore, when the first request received by the receiving unit 320 merely requests for the identification information of the aerial user terminal, the receiving unit 320 may further receive another request transmitted by the second communication device after transmitting the identification information of the aerial user terminal. The another request may request for other information of the aerial user terminal in addition to the identification information of the aerial user terminal, such as one or more pieces of the mobility status information, the location status information, the radio resource measurement information, the configuration information, and the scheduling information of the aerial user terminal. Alternatively, the another request may also request for the identification information of the aerial user terminal and other information of the aerial user terminal, such as one or more pieces of the mobility status information, the location status information, the radio resource measurement information, the configuration information, and the scheduling information of the aerial user terminal.

For example, according to one example of this embodiment, the receiving unit 320 may be further configured to receive a second request transmitted by the second communication device, where the second request includes request information for at least one piece of the mobility status information of the aerial user terminal, the location status information of the aerial user terminal, the radio resource measurement information of the aerial user terminal, the configuration information of the aerial user terminal, and the scheduling information of the aerial user terminal, and the transmitting unit 310 may be further configured to transmit the requested information to the second communication device in response to the second request.

In this example, the second request may be a request for other information in addition to identification information of part of the plurality of aerial user terminals, such as one or more pieces of mobility status information, location status information, radio resources measurement information, configuration information, and scheduling information of the part of aerial user terminals.

Furthermore, in order to enable farther communication devices that are not adjacent to (or do not have a communication interface, such as an X2 interface) also acquire the first information, when transmitting the first information to the second communication device, the transmitting unit 310 may instruct the second communication device to forward the received first information to other communication devices. For example, according to one example of this embodiment, the transmitting unit 310 may be further configured to transmit second information to the second communication device, where the second information includes information on forwarding the first information.

In this example, the information on forwarding the first information may include the number of times to forward the first information. Alternatively, in this example, the information on forwarding the first information may further include set information of base stations to which the first information is forwarded.

With the above embodiment, the first communication device may transmit information related to the aerial user terminal to the second communication device, so as to perform interference management such as detection, suppression and avoidance for interference suffered by the second communication device from the aerial user terminal (i.e., uplink interference) and/or interference suffered by the aerial user from the second communication device (i.e., downlink interference).

Figure 4A:
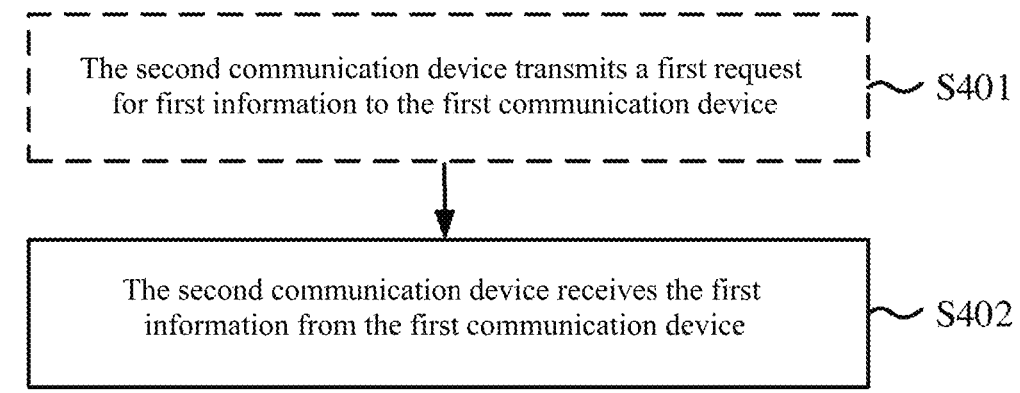
FIG. 4A is a flowchart of another wireless communication method according to one embodiment of the present disclosure.
Figure 4B:
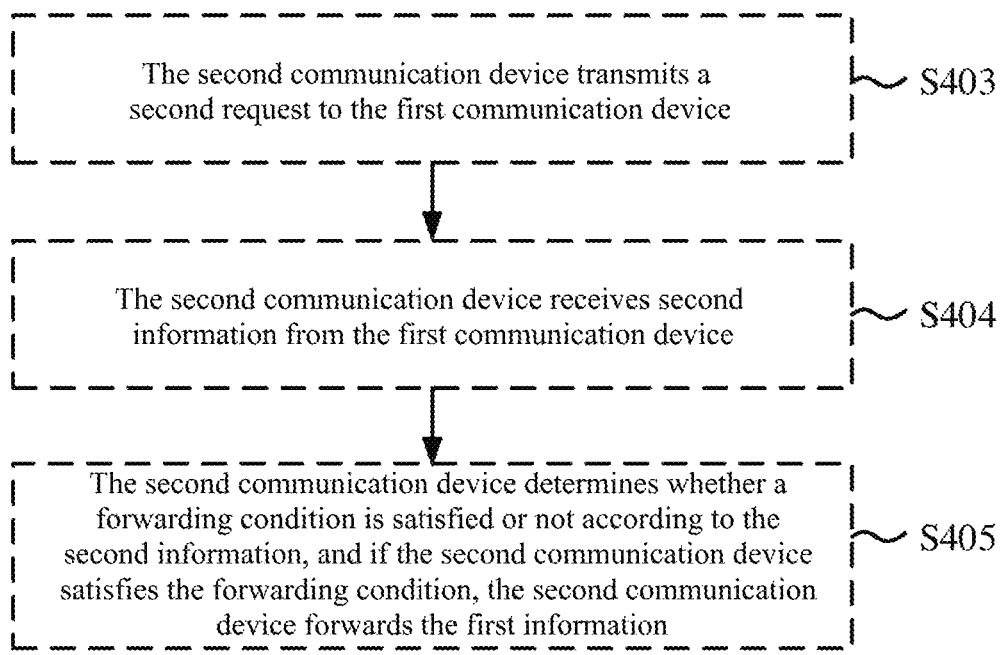
FIG. 4B is another flowchart of another wireless communication method according to one embodiment of the present disclosure.

A wireless communication method 400 on the receiving side corresponding to the method 200 shown in FIGS. 2A and 2B according to one embodiment of the present disclosure will be described below with reference to FIGS. 4A and 4B. FIG. 4A is a flowchart of another wireless communication method 400 according to one embodiment of the present disclosure. FIG. 4B is another flowchart of another wireless communication method 400 according to one embodiment of the present disclosure. As shown in FIG. 4A, in step S402, a second communication device receives first information from a first communication device, where the first information includes identification information of an aerial user terminal. The first information in this step may be information indicating that it is an aerial user terminal, rather than information indicating that it is an ordinary user equipment or terminal. Herein, the first communication device and the second communication device may be, for example, the first base station 110 and the second base station 120 shown in FIG. 1, respectively, and the aerial user terminal may be the aerial user terminal 150 shown in FIG. 1.

In this embodiment, the identification information of the aerial user terminal may include information that can uniquely identify the aerial user terminal, as specifically described above.

With this embodiment, the second communication device may receive, from the first communication device, the identification information of the aerial user terminal served by the first communication device, so as to perform interference management such as detection, suppression and avoidance for interference suffered by the second communication device from the aerial user terminal (i.e., uplink interference) and/or interference suffered by the aerial user from the second communication device (i.e., downlink interference). For example, taking the uplink interference as an example, after the second communication device acquires the identification information of the aerial user terminal, the second communication device may detect the presence of the aerial user terminal and take certain actions to suppress interference from the aerial user terminal. Specifically, for example, the second communication device may track the aerial user terminal and predict an interference level of the aerial user terminal to avoid interference, and the second communication device may also initiate cooperation with the first communication device to suppress interference if necessary.

According to one example of this embodiment, the first information in step S402 may further include at least one piece of mobility status information of the aerial user terminal, location status information of the aerial user terminal, radio resource measurement information of the aerial user terminal, configuration information of the aerial user terminal, and scheduling information of the aerial user terminal. The specific description is as described above.

In this example, the second communication device receives, from the first communication device, the identification information of the aerial user terminal served by the first communication device and at least one piece of the mobility status information, the location status information, the radio resource measurement information, the configuration information, or the scheduling information from the first communication device, so as to perform more accurate interference management such as detection, suppression and avoidance for interference suffered by the second communication device from the aerial user terminal (i.e., uplink interference) and/or interference suffered by the aerial user from the second communication device (i.e., downlink interference).

Furthermore, according to one example of this embodiment, the second communication device may be passively selected by the first communication device before receiving the first information from the first communication device. For example, before step S402, the second communication device may be selected by the first communication device from a plurality of candidate communication devices. For example, the plurality of candidate communication devices may be a plurality of communication devices adjacent to the first communication device. As mentioned above, the first communication device may be the first base station 110 shown in FIG. 1. Referring back to FIG. 1, base stations adjacent to the first base station 110, that is, the second base station 120 and the third base station 130 may be the plurality of candidate communication devices herein.

In this case, the second communication device may be arbitrarily selected by the first communication device from the plurality of candidate communication devices, for example, the second base station 120 may be selected as the second communication device. Alternatively, the second communication device may be a communication device (such as the second base station 120) that suffers severe interference from the aerial user terminal and is selected by the first communication device from the plurality of candidate communication devices according to the radio resource measurement information of the aerial user terminal, such as an RSRP report. Alternatively, the second communication device may also be a communication device (such as the second base station 120) that may suffer severe interference from the aerial user terminal and is selected by the first communication device from the plurality of candidate communication devices according to the mobility status information of the aerial user terminal, such as a flying speed, a flying direction, and the like.

According to another example of this embodiment, the second communication device may also actively transmit a request for the first information to the first communication device, and then receive the first information. For example, before step S402, the method 400 may further comprise step S401, as shown in FIG. 4A. In step S401, the second communication device transmits a first request for the first information to the first communication device. Then, the first communication device transmits the first information in response to the first request, and accordingly, the second communication device receives the first information.

In this example, the first request in step S401 may be the second communication device requesting from the first communication device information of part or all of the aerial user terminals served by the first communication device, such as one or more pieces of the identification information, the mobility status information, the location status information, the radio resource measurement information, the configuration information, and the scheduling information. For example, the second communication device may merely request from the first communication device identification information of all aerial user terminals served by the first communication device, and then in response to the request from the second communication device, the first communication device may transmit the identification information of all aerial user terminals that it serves to the second communication device by including them in the first information.

For another example, the second communication device may request from the first communication device identification information and mobility status information of a part of aerial user terminals (such as aerial user terminals with a relatively high flying height) served by the first communication device. Then, in response to the request from the second communication device, the first communication device may transmit the identification information and the mobility status information of the part of aerial user terminals to the second communication device by including them in the first information.

Furthermore, when the first request transmitted by the second communication device merely requests the identification information of the aerial user terminal, the second communication device may further transmit another request after receiving the identification information of the aerial user terminal. The another request may request for other information of the aerial user terminal in addition to the identification information of the aerial user terminal, such as one or more pieces of the mobility status information, the location status information, the radio resource measurement information, the configuration information, and the scheduling information of the aerial user terminal. Alternatively, the another request may also request for the identification information of the aerial user terminal and other information of the aerial user terminal, such as one or more of the mobility status information, the location status information, the radio resource measurement information, the configuration information, and the scheduling information of the aerial user terminal.

For example, according to one example of this embodiment, after step S402, the method 400 may further comprise step S403, as shown in FIG. 4B. In step S403, the second communication device transmits a second request to the first communication device, where the second request includes request information for at least one piece of the mobility status information of the aerial user terminal, the location status information of the aerial user terminal, the radio resource measurement information of the aerial user terminal, the configuration information of the aerial user terminal, and the scheduling information of the aerial user terminal. Then, the first communication device transmits the requested information to the second communication device in response to the second request, and accordingly, the second communication device receives the requested information.

In this example, the second request may be a request for other information in addition to identification information of part of the plurality of aerial user terminals, such as a request for one or more pieces of mobility status information, location status information, radio resources measurement information, configuration information, and scheduling information of the part of aerial user terminals.

Furthermore, in order to enable farther communication devices that are not adjacent to (or do not have a communication interface, such as an X2 interface) also acquire the first information, when receiving the first information from the first communication device, the second communication device may further receive information instructing, by the first communication device, the second communication device to forward the received first information to other communication devices. For example, according to one example of this embodiment, at or after step S402, the method 400 may further comprise step S404, as shown in FIG. 4B. In step S404, the second communication device receives second information from the first communication device, where the second information includes information on forwarding the first information. Moreover, after step S404, the method 400 may further comprise step S405, as shown in FIG. 4B. In step S405, the second communication device determines whether a forwarding condition is satisfied or not according to the second information, and if the second communication device satisfies the forwarding condition, the second communication device forwards the first information.

In this example, the information on forwarding the first information may include the number of times to forward the first information. For example, the number of times to forward the first information may be a hopping number to transmit the first information by hopping. That is, the first information may be forwarded to a plurality of base stations in a multi-hop manner. As mentioned above, the first communication device and the second communication device may be the first base station 110 and the second base station 120 shown in FIG. 1, respectively. Referring back to FIG. 1, the first base station 110 may transmit the hopping number to transmit the first information by hopping to the second base station 120. After receiving the hopping number, the second base station 120 may determine whether a forwarding condition is satisfied or not according to the hopping number, and if yes, forward the first information. In addition, after receiving the hopping number, the second base station 120 may determine that the forwarding condition is not satisfied according to the hopping number, and then the second base station 120 may not forward the first information, or may transfer the first information to other base stations in other ways. For example, after the second base station 120 receives the hopping number, the second base station 120 may perform a mathematical operation (i.e., an operation of subtracting one) on the received hopping number to obtain an updated hopping number, then determine whether the updated hopping number is non-zero or not, and if yes, it may determine that the second base station 120 satisfies the forwarding condition, otherwise, it may determine that the second base station 120 does not satisfy the forwarding condition. In addition, when the second base station 120 satisfies the forwarding condition, the second base station 120 may also forward the updated hopping number and the first information to a next base station. It should be noted that the second base station 120 would not forward the first information back to the first base station 110.

Herein, the hopping number received by the second base station 120 being 3 will be taken as an example for description. For example, the second base station 120 receives a hopping number of 3 from the first base station 110 through an X2 interface. Since the first information has been forwarded once by the first base station 110 to the second base station 120, the second base station 120 may perform an operation of subtracting one on the hopping number and obtain an updated hopping number of 2. Since the updated hopping number of 2 is non-zero, the second base station 120 satisfies the forwarding condition, and then the second base station 120 may forward the first information and the updated hopping number of 2 to the fourth base station 140 through the X2 interface. The fourth base station 140 may perform similar operations as the second base station 120. Until the forwarding condition is not satisfied, forwarding of the first information may be stopped. It should be noted that the second base station 120 would not forward the first information back to the first base station 110. It can be seen that, in a multi-hop manner, the first communication device forwards the first information to its adjacent base station and farther base stations via the second communication device, so that the farther base stations may also acquire information related to the aerial user terminal served by the first communication device for interference management.

In this example, the information on forwarding the first information may further include set information of base stations to which the first information may be forwarded. That is, the first information may be forwarded to one or more base stations of a set of base stations. As mentioned above, the first communication device and the second communication device may be the first base station 110 and the second base station 120 shown in FIG. 1, respectively. Referring back to FIG. 1, the first base station 110 may determine that the set information of the base stations to which the first information is forwarded may be, for example, {the second base station 120, the third base station 130, the fourth base station 140}, then the first base station 110 may transmit the set information of the base stations to base stations in the set of base stations that are adjacent to the first base station 110, such as the second base station 120 and the third base station 130. Since base stations in the set of base stations that are not adjacent to the first base station 110, such as the fourth base station 140, cannot directly communicate with the first base station 110, the first base station 110 cannot transmit the first information to the fourth base station 140. Herein after, the first base station 110 transmitting the first information to the second base station 120 will be taken as an example for description. After receiving the set information of the base stations, the second base station 120 may determine whether the forwarding condition is satisfied or not according to the set information of the base stations, and if yes, forward the first information. For example, the second base station 120 may determine whether there is its own neighboring base stations or not in the set information of the base stations, such as whether there is the fourth base station 140 adjacent to the second base station 120 or not, and if yes, it may forward the first information to the fourth base station 140 in the set of base stations. In addition, after the second base station 120 receives the set information of the base stations, it may determine that the forwarding condition is not satisfied according to the set information of the base stations, then the second base station 120 may not forward the first information, or may transfer the first information to other base stations in other ways. It should be noted that the second base station 120 would not forward the first information back to the first base station 110.

Furthermore, in step S405, the first base station 110 may also update the set information of the base stations, and transmit the updated set information of the base stations to a next base station or a plurality of base stations. For example, since the first information has been forwarded by the first base station 110 to the second base station 120 adjacent to the first base station 110, the first base station 110 may remove the second base station 120 from the set information of the base stations to obtain updated set information of the base stations, such as {the third base station 130, the fourth base station 140}, and then forward the first information and the updated set information of the base stations, {the third base station 130, the fourth base station 140}, to the second base station 120. The second base station 120 may perform operations similar to the first base station 110. Until the updated set information of the base stations is empty, forwarding of the first information may be stopped.

For another example, in the case that the first information has been forwarded by the first base station 110 to the second base station 120 adjacent to the first base station 110 and has also been forwarded by the first base station 110 to the third base station 130 adjacent to the first base station 110, the first base station 110 may remove the second base station 120 and the third base station 130 from the set information of the base stations to obtain updated set information of the base stations, such as (the fourth base station 140), and then forward the first information and the updated set information of the base stations, {the base station 140}, to the second base station 120 and the third base station 130. Both the second base station 120 and the third base station 130 may perform operations similar to the first base station 110, that is, to remove the fourth base station 140 adjacent thereto from the set information of the base stations, and then forward the first information and the empty set information of the base stations to the fourth base station 140, or just forward the first information to the fourth base station 140. After receiving the first information, the fourth base station 140 no longer forwards the first information. It can be seen that, in this way, the first communication device may also forward the first information to its neighboring base stations and farther base stations via the second communication device, so that the farther base stations may also acquire information related to the aerial user terminal served by the first communication device for interference management.

Furthermore, according to one example of this embodiment, the second communication device may periodically receive the first information and/or the second information from the first communication device. For example, after periodically receiving a radio resource measurement report of the aerial user terminal, such as an RSRP report, the first communication device may periodically transmit the first information and/or the second information. Accordingly, the second communication device may periodically perform step S402 and/or S404.

According to another example of this embodiment, the second communication device may non-periodically receive the first information and/or the second information from the first communication device. For example, the first communication device may determine when to transmit the first information and/or the second information to the second communication device according to a network status of the wireless communication system. For example, when the network status of the wireless communication system is poor, the minimum number of cells that need to be measured may be set for the aerial user terminal, to trigger the aerial user terminal to report results of radio resource measurement to the first communication device, so that the aerial user terminal reports to the first communication device after cell measurement is finished. In this case, the first communication device may transmit the first information and/or the second information after receiving the radio resource measurement report of the aerial user terminal. Accordingly, the second communication device may perform step S402 and/or step S404.

With the above embodiment, the second communication device may receive, from the first communication device, information related to the aerial user terminal served by the first communication device, so as to perform interference management such as detection, suppression and avoidance for interference suffered by the second communication device from the aerial user terminal (i.e., uplink interference) and/or interference suffered by the aerial user from the second communication device (i.e., downlink interference).

Figure 5:
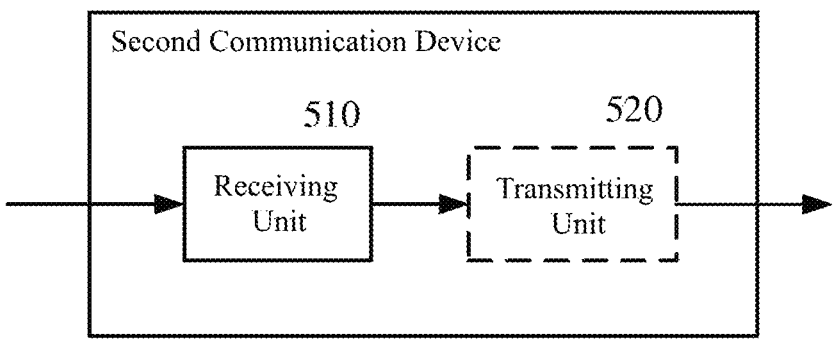
FIG. 5 shows a schematic structural diagram of a second communication device according to one embodiment of the present disclosure.

A second communication device 500 that performs the method 400 shown in FIGS. 4A and 4B according to one embodiment of the present disclosure will be described below with reference to FIG. 5. FIG. 5 shows a schematic structural diagram of the second communication device 500 according to one embodiment of the present disclosure. Since functions of the second communication device 500 are the same as the details of the method described above with reference to FIGS. 4A and 4B, a detailed description of the same content is omitted herein for simplicity.

As shown in FIG. 5, the second communication device 500 comprises a receiving unit 510 configured to receive first information from a first communication device, where the first information includes identification information of an aerial user terminal. The first information in this step may be information indicating that it is an aerial user terminal, rather than information indicating that it is an ordinary user equipment or terminal. Herein, the first communication device and the second communication device 500 may be, for example, the first base station 110 and the second base station 120 shown in FIG. 1, respectively, and the aerial user terminal may be the aerial user terminal 150 shown in FIG. 1.

In this embodiment, the first communication device and the second communication device may pre-negotiate or pre-determine a data format for transmitting the first information, so that when the first communication device transmits the first information in the data format and the receiving unit 510 receives the first information transmitted in the data format, the second communication device may acquire that the first information is information related to the aerial user terminal rather than information related to an ordinary user equipment or terminal.

With this embodiment, the second communication device may receive, from the first communication device, the identification information of the aerial user terminal served by the first communication device, so as to perform interference management such as detection, suppression and avoidance for interference suffered by the second communication device from the aerial user terminal (i.e., uplink interference) and/or interference suffered by the aerial user from the second communication device (i.e., downlink interference).

According to one example of this embodiment, the first information received by the receiving unit 510 may further include at least one piece of mobility status information of the aerial user terminal, location status information of the aerial user terminal, radio resource measurement information of the aerial user terminal, configuration information of the aerial user terminal, and scheduling information of the aerial user terminal. The specific description is as described above.

In this example, the receiving unit 510 receives, from the first communication device, the identification information of the aerial user terminal served by the first communication device and at least one piece of the mobility status information, the location status information, the radio resource measurement information, the configuration information, or the scheduling information, so as to perform more accurate interference management such as detection, suppression and avoidance for interference suffered by the second communication device from the aerial user terminal (i.e., uplink interference) and/or interference suffered by the aerial user from the second communication device (i.e., downlink interference).

Furthermore, according to one example of this embodiment, the second communication device may be passively selected by the first communication device before receiving the first information from the first communication device. For example, before the receiving unit 510 receives the first information, the second communication device may be selected by the first communication device from a plurality of candidate communication devices. For example, the plurality of candidate communication devices may be a plurality of communication devices adjacent to the first communication device. As mentioned above, the first communication device may be the first base station 110 shown in FIG. 1. Referring back to FIG. 1, base stations adjacent to the first base station 110, that is, the second base station 120 and the third base station 130 may be the plurality of candidate communication devices herein.

According to another example of this embodiment, the second communication device may also actively transmit a request for the first information to the first communication device, and then receive the first information. For example, the second communication device 500 may further comprise a transmitting unit 520 configured to transmit a first request for the first information to the first communication device before the receiving unit 510 receives the first information from the first communication device. Then, the first communication device transmits the first information in response to the first request, and accordingly, the receiving unit 510 receives the first information.

In this example, the first request transmitted by the transmitting unit 520 may be the second communication device requesting from the first communication device information of part or all of the aerial user terminals served by the first communication device, such as one or more pieces of the identification information, the mobility status information, the location status information, the radio resource measurement information, the configuration information, and the scheduling information. For example, the transmitting unit 520 may merely request from the first communication device identification information of all aerial user terminals served by the first communication device, and then in response to the request from the second communication device, the first communication device may transmit the identification information of all aerial user terminals that it serves to the receiving unit 510 by including them in the first information.

For another example, the transmitting unit 520 may request from the first communication device identification information and mobility status information of a part of aerial user terminals (such as aerial user terminals with a relatively high flying height) served by the first communication device. Then, in response to the request from the second communication device, the first communication device may transmit the identification information and the mobility status information of the part of aerial user terminals to the receiving unit 510 by including them in the first information.

In this example, the first request transmitted by the transmitting unit 520 may also be other devices requesting, via the second communication device, from the first communication device information of part or all of the aerial user terminals served by the first communication device, such as one or more pieces of the identification information, the mobility status information, the location status information, the radio resource measurement information, the configuration information, and the scheduling information. For example, other devices may transmit request information for the first communication device to the second communication device. After receiving the request information, the receiving unit 510 may process the request information and transmit the processed request information to the first communication device via the transmitting unit 520. Certainly, the receiving unit 510 may not process the request information, and directly transmit the request information to the first communication device via the transmitting unit 520.

Furthermore, when the first request transmitted by the transmitting unit 520 merely requests the identification information of the aerial user terminal, the transmitting unit 520 may further transmit another request after the receiving unit 510 receives the identification information of the aerial user terminal. The another request may request for other information of the aerial user terminal in addition to the identification information of the aerial user terminal, such as one or more pieces of the mobility status information, the location status information, the radio resource measurement information, the configuration information, and the scheduling information of the aerial user terminal. Alternatively, the another request may also request for the identification information of the aerial user terminal and other information of the aerial user terminal, such as one or more of the mobility status information, the location status information, the radio resource measurement information, the configuration information, and the scheduling information of the aerial user terminal.

For example, according to one example of this embodiment, the transmitting unit 520 may be further configured to transmit a second request to the first communication device before the receiving unit 510 receives second information from the first communication device, where the second request includes request information for at least one piece of the mobility status information of the aerial user terminal, the location status information of the aerial user terminal, the radio resource measurement information of the aerial user terminal, the configuration information of the aerial user terminal, and the scheduling information of the aerial user terminal. Then, the first communication device transmits the requested information to the receiving unit 510 in response to the second request, and accordingly, the receiving unit 510 receives the requested information.

Furthermore, in order to enable farther communication devices that are not adjacent to (or do not have a communication interface, such as an X2 interface) also acquire the first information, when receiving the first information from the first communication device, the second communication device may further receive information instructing, by the first communication device, the second communication device to forward the received first information to other communication devices. For example, according to one example of this embodiment, the receiving unit 510 may be further configured to receive second information from the first communication device, where the second information includes information on forwarding the first information. Moreover, the transmitting unit 520 may be further configured to determine whether a forwarding condition is satisfied or not according to the second information, and if the forwarding condition is satisfied, forward the first information.

In this example, the information on forwarding the first information may include the number of times to forward the first information. Alternatively, in this example, the information on forwarding the first information may further include set information of base stations to which the first information is forwarded.

With the above embodiment, the second communication device may receive, from the first communication device, information related to the aerial user terminal served by the first communication device, so as to perform interference management such as detection, suppression and avoidance for interference suffered by the second communication device from the aerial user terminal (i.e., uplink interference) and/or interference suffered by the aerial user from the second communication device (i.e., downlink interference).

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. via wire and/or wireless), and the respective functional blocks may be implemented by these apparatuses.

Figure 6:
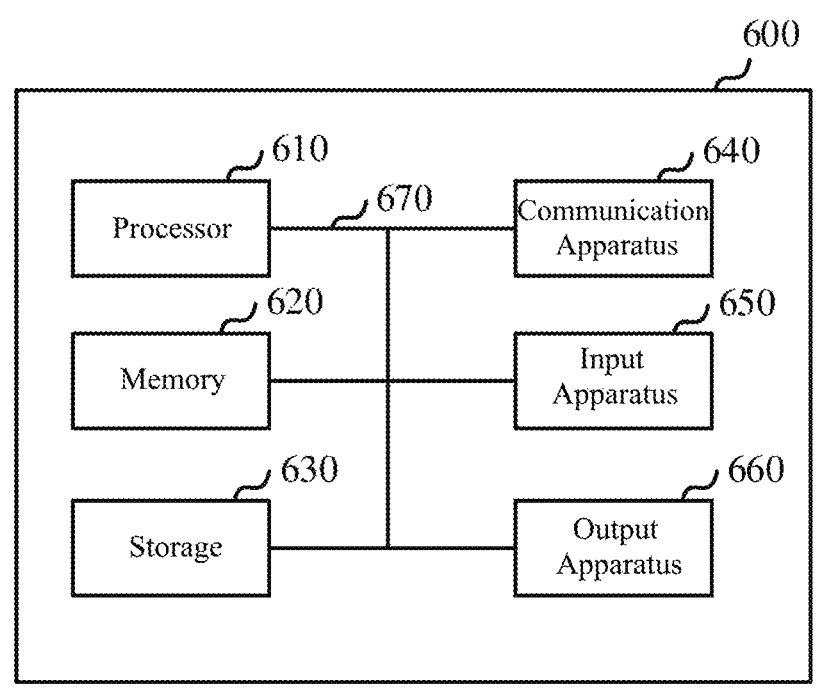
FIG. 6 is a schematic diagram of a hardware structure of a first communication device, a second communication device, or an aerial user terminal involved in the embodiments of the present disclosure.

For example, devices (such as the first communication device, the second communication device, the aerial user terminal and the like) in one embodiment of the present disclosure may function as a computer that executes the processes of the wireless communication method of the present disclosure. FIG. 6 is a schematic diagram of a hardware structure of a device 600 (the first communication device, the second communication device or the aerial user terminal) involved in the embodiments of the present disclosure. The device 600 (the first communication device, the second communication device or the aerial user terminal) described above may be constituted as a computer apparatus that physically comprises a processor 610, a memory 620, a storage 630, a communication apparatus 640, an input apparatus 650, an output apparatus 660, a bus 670 and the like In addition, in the following description, terms such as "apparatus" may be replaced with circuits, devices, units, and the like. The hardware structure of the wireless base station and the user terminal may include one or more of the respective apparatuses shown in the figure, or may not include a part of the apparatuses.

For example, merely one processor 610 is illustrated, but there may be a plurality of processors. Furthermore, processes may be performed by one processor, or processes may be performed by more than one processor simultaneously, sequentially, or by other methods. In addition, the processor 610 may be installed by more than one chip.

Respective functions of the device 600 may be implemented, for example, by reading specified software (program) on hardware such as the processor 610 and the memory 620, so that the processor 610 performs computations, controls communication performed by the communication apparatus 640, and controls reading and/or writing of data in the memory 620 and the storage 630.

The processor 610, for example, operates an operating system to control the entire computer. The processor 610 may be constituted by a Central Processing Unit (CPU), which includes interfaces with peripheral apparatuses, a control apparatus, a computing apparatus, a register and the like. For example, the determining unit, the adjusting unit and the like described above may be implemented by the processor 610.

In addition, the processor 610 reads programs (program codes), software modules and data from the storage 630 and/or the communication apparatus 640 to the memory 620, and execute various processes according to them. As for the program, a program causing computers to execute at least a part of the operations described in the above embodiments may be employed. For example, the determining unit of the user terminal may be implemented by a control program stored in the memory 620 and operated by the processor 610, and other functional blocks may also be implemented similarly.

The memory 620 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 620 may also be referred to as a register, a cache, a main memory (a main storage apparatus) and the like. The memory 620 may store executable programs (program codes), software modules and the like for implementing the method involved in one embodiment of the present disclosure.

The storage 630 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 630 may also be referred to as an auxiliary storage apparatus.

The communication apparatus 640 is a hardware (transceiver device) performing communication between computers via a wired and/or wireless network, and is also referred to as a network device, a network controller, a network card, a communication module and the like, for example. The communication apparatus 640 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 640.

The input apparatus 650 is an input device (e.g., a keyboard, a mouse, a microphone, a switch, a button, a sensor and the like) that receives input from the outside. The output apparatus 660 is an output device (e.g., a display, a speaker, a Light Emitting Diode (LED) light and the like) that performs outputting to the outside. In addition, the input apparatus 650 and the output apparatus 660 may also be an integrated structure (e.g., a touch screen).

Furthermore, the respective apparatuses such as the processor 610 and the memory 620 are connected by the bus 670 that communicates information. The bus 670 may be constituted by a single bus or by different buses between the apparatuses.

Furthermore, the wireless base station and the user terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 610 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

Furthermore, the information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information units may be identified by any suitable names, the various names assigned to these various channels and information elements are not limitative in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

The information, signals and the like that are input or output may be stored in a specific location (for example, in a memory), or may be managed in a control table. The information, signals and the like that are input or output may be overwritten, updated or appended. The information, signals and the like that are output may be deleted. The information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. At this time, functions provided by the first communication device and the second communication device of the above device 600 may be regarded as functions provided by the user terminal. Furthermore, the words "uplink" and "downlink" may also be replaced with "side". For example, an uplink channel may be replaced with a side channel.

Also, the user terminal in this specification may be replaced with a wireless base station. At this time, functions provided by the above user terminal may be regarded as functions provided by the first communication device and the second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), LTE-Advanced (LTE-A), LTE-Beyond (LTE-B), a super 3rd generation mobile communication system (SUPER 3G), Advanced International Mobile Telecommunication (IMT-Advanced), a 4th generation mobile communication system (4G), a 5th generation mobile communication system (5G), Future Radio Access (FRA), New Radio Access Technology (New-RAT), New Radio (NR), New radio access (NX), Future generation radio access (FX), a Global System for Mobile communications (GSM®), CDMA 2000, Ultra Mobile Broadband (UMB), IEEE 802.11 (Wi-Fi®), IEEE 802.16 (WiMAX®), IEEE 802.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A wireless communication method, comprising:
    transmitting, by a first communication device, first information to a second communication device, wherein the first information includes identification information of an aerial user terminal,
    wherein the first information further includes at least one piece of mobility status information of the aerial user terminal, radio resource measurement information of the aerial user terminal, configuration information of the aerial user terminal, and scheduling information of the aerial user terminal.

2. A first communication device for wireless communication, comprising:
a transmitting unit configured to transmit first information to a second communication device, wherein the first information includes identification information of an aerial user terminal,
wherein the first information further includes at least one piece of mobility status information of the aerial user terminal, radio resource measurement information of the aerial user terminal, configuration information of the aerial user terminal, and scheduling information of the aerial user terminal.

3. The first communication device of claim 2, wherein the transmitting unit is further configured to transmit second information to the second communication device, wherein the second information includes information on forwarding the first information.

4. The first communication device of claim 3, wherein the information on forwarding the first information includes a number of times to forward the first information.

5. The first communication device of claim 3, wherein the information on forwarding the first information includes set information of base stations to which the first information is forwarded.

6. The first communication device of claim 2, wherein the first information further includes location status information of the aerial user terminal.

7. The first communication device of claim 2,
the first communication device further comprising a receiving unit configured to receive a first request for the first information transmitted by the second communication device;
wherein the transmitting unit is configured to transmit the first information to the second communication device in response to the first request.

8. The first communication device of claim 7,
the receiving unit further configured to receive a second request transmitted by the second communication device,
wherein the second request includes request information for at least one piece of mobility status information of the aerial user terminal, location status information of the aerial user terminal, radio resource measurement information of the aerial user terminal, configuration information of the aerial user terminal, and scheduling information of the aerial user terminal; and
wherein the transmitting unit is configured to transmit information requested by the second communication device to the second communication device in response to the second request.

9. A second communication device for wireless communication, comprising:
a receiving unit configured to receive first information from a first communication device, wherein the first information includes identification information of an aerial user terminal,
wherein the receiving unit is further configured to receive second information from the first communication device, wherein the second information includes information on forwarding the first information, and
wherein the first communication device serves as a serving base station for the aerial user terminal.

10. The second communication device of claim 9,
the second communication device further comprising:
a transmitting unit configured to determine whether a forwarding condition is satisfied or not according to the second information, and forward the first information if the forwarding condition is satisfied.

11. The second communication device of claim 10, wherein the information on forwarding the first information includes a number of times to forward the first information.

12. The second communication device of claim 10, wherein the information on forwarding the first information includes set information of base stations to which the first information is forwarded.

13. The first communication device of claim 9, wherein the first information further includes at least one piece of mobility status information of the aerial user terminal, location status information of the aerial user terminal, radio resource measurement information of the aerial user terminal, configuration information of the aerial user terminal, and scheduling information of the aerial user terminal.

14. The second communication device of claim 9, further comprising a transmitting unit configured to transmit a first request for the first information to the first communication device before the receiving unit receives the first information from the first communication device.

15. The second communication device of claim 14, wherein the transmitting unit is further configured to transmit a second request to the first communication device before the receiving unit receives second information from the first communication device, wherein the second request includes request information for at least one piece of mobility status information of the aerial user terminal, location status information of the aerial user terminal, radio resource measurement information of the aerial user terminal, configuration information of the aerial user terminal, and scheduling information of the aerial user terminal.

* * * * *